US010198006B2

(12) United States Patent
Kazama

(10) Patent No.: US 10,198,006 B2
(45) Date of Patent: Feb. 5, 2019

(54) PARKING MANAGEMENT SYSTEM AND ITS CONTROL METHOD

(71) Applicant: Hitachi, Ltd., Chiyoda-ku, Tokyo (JP)

(72) Inventor: Yoriko Kazama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/455,565

(22) Filed: Mar. 10, 2017

(65) Prior Publication Data
US 2017/0329342 A1    Nov. 16, 2017

(30) Foreign Application Priority Data

May 11, 2016    (JP) ................. 2016-095603

(51) Int. Cl.
*G05D 1/02* (2006.01)
*G05D 1/00* (2006.01)
*G06Q 10/02* (2012.01)

(52) U.S. Cl.
CPC ......... *G05D 1/0225* (2013.01); *G05D 1/0011* (2013.01); *G05D 1/0287* (2013.01); *G06Q 10/02* (2013.01); *G05D 2201/0213* (2013.01); *G06Q 2240/00* (2013.01)

(58) Field of Classification Search
CPC . G05D 1/02; G06Q 10/02; G08G 1/14; G07B 15/00
USPC .................................. 705/5; 701/2
See application file for complete search history.

(56) References Cited

U.S. PATENT DOCUMENTS

| 6,336,072 | B1* | 1/2002 | Takayama | G01C 21/34 340/995.1 |
| 9,087,453 | B2* | 7/2015 | Krivacic | G06Q 10/02 |
| 9,323,993 | B2* | 4/2016 | Wang | G06K 9/00812 |
| 2002/0186144 | A1* | 12/2002 | Meunier | G07B 15/00 340/4.6 |
| 2014/0022051 | A1* | 1/2014 | Levien | G05D 1/0011 340/5.2 |
| 2014/0024999 | A1* | 1/2014 | Levien | G05D 1/00 604/66 |
| 2014/0036076 | A1* | 2/2014 | Nerayoff | H04N 7/181 348/148 |

(Continued)

FOREIGN PATENT DOCUMENTS

JP        2011-89354 A        5/2011

*Primary Examiner* — Thomas G Black
*Assistant Examiner* — Wae L Louie
(74) *Attorney, Agent, or Firm* — Crowell & Moring LLP

(57) ABSTRACT

A parking management system and its control method for controlling a plurality of vehicles and efficiently managing a large-scale parking place are proposed. A parking management system for managing parking of a vehicle includes: a guiding system for automatically guiding the vehicle from a passenger space to a certain parking space; a control system for controlling the guiding system; and a management system for accepting a parking reservation of the vehicle from a terminal system and conveying reservation information and identification information of the vehicle to the control system, wherein after the vehicle arrives at the passenger space and a passenger gets off the vehicle, the control system causes the guiding system to guide the vehicle to, and park the vehicle at, the certain parking space on the basis of the reservation information and the identification information.

11 Claims, 12 Drawing Sheets

(56) References Cited

U.S. PATENT DOCUMENTS

| | | | | |
|---|---|---|---|---|
| 2014/0218527 A1* | 8/2014 | Subramanya | .......... | G08G 1/143 |
| | | | | 348/148 |
| 2014/0236686 A1* | 8/2014 | Grush | .................... | G07B 15/02 |
| | | | | 705/13 |
| 2015/0051926 A1* | 2/2015 | Aaron | .................... | G06Q 10/02 |
| | | | | 705/5 |
| 2015/0066545 A1* | 3/2015 | Kotecha | ................ | G06Q 10/02 |
| | | | | 705/5 |
| 2015/0170518 A1* | 6/2015 | Rodriguez Garza | .. | G08G 1/144 |
| | | | | 340/932.2 |
| 2016/0096506 A1* | 4/2016 | Shreve | ................. | B60R 25/102 |
| | | | | 348/148 |
| 2016/0180712 A1* | 6/2016 | Rosen | .................... | G01C 21/36 |
| | | | | 705/5 |
| 2016/0371607 A1* | 12/2016 | Rosen | .................... | G06Q 10/02 |
| 2016/0371608 A1* | 12/2016 | Kahng | .................... | G06Q 10/02 |
| 2017/0018183 A1* | 1/2017 | Rosen | .................... | G08G 1/015 |
| 2017/0329342 A1* | 11/2017 | Kazama | ............... | G05D 1/0011 |
| 2017/0330399 A1* | 11/2017 | Nordbruch | ............. | G08G 1/005 |

\* cited by examiner

FIG.5

| User ID | Reservation Time | Entry -Exit | Car Stop Position | Positional Information | Car Number |
|---|---|---|---|---|---|
| 1 | 5/1 10:00 | Entry | A1 Parking | ... | I 11-11 |
| 2 | 5/1 11:00 | Exit | Exit 1 | ... | A 00-00 |
| ... | | | | | |
| | | | | | |

FIG.6

| Recognition ID | Parking Area Position (X-coordinate) | Parking Area Position (Y-coordinate) | Destination | Recognized Object | ... |
|---|---|---|---|---|---|
| 1 | 10 | 20 | A1 Parking | Vehicle (I 11-11) | |
| 2 | 20 | 50 | Exit 1 | Vehicle (A 00-00) | |
| ... | 30 | 70 | Entrance 1 | Human | |
| | | | | | |

FIG.7

| Vehicle ID (T31) | Length (T32) | Height (T33) | Type (T34) | Vehicle Type (T35) | Car Number (T36) | Color (T37) | Owner (T38) | ... |
|---|---|---|---|---|---|---|---|---|
| 1 | 2.5 | 1.2 | RV | Company T XX | I 11-11 | Black | A | |
| 2 | 2.3 | 1.3 | Van | Company H YY | A 00-00 | Red | B | |
| | | | | | | | | |
| | | | | | | | | |

T3

PARKING MANAGEMENT SYSTEM AND ITS CONTROL METHOD

TECHNICAL FIELD

The present invention relates to a parking management system and its control method. Particularly, the invention relates to a parking management system and its control method suited for use in parking management of a large number of vehicles at a large-scale parking place built on the premises of a large-scale facility such as a large-scale commercial facility or a large-scale amusement facility.

BACKGROUND ART

For example, a parking apparatus described in Japanese Laid-Open Patent Application Publication No. 2011-089354 is known as a conventional parking management system. This parking apparatus is designed for the purpose of making it possible to automatically park a vehicle equipped with a self-propelled function in a mechanical parking apparatus only by leaving the vehicle behind by a driver. The parking apparatus is configured so that a vehicle which moves onto an attitude control device from outside and stops there is detected by a vehicle measurement device and front and rear positions, directions, and size of the vehicle are calculated by an arithmetic controller of a receiving-side control device; and the arithmetic controller obtains a parking approval of the vehicle from a driving controller for a vehicle-side control device by means of radio communication and also issues a command to the vehicle-side control device to maintain the vehicle in a state capable of self-driving, further issues a direction change command to the attitude control device on the basis of the front and back positions and directions of the vehicle as calculated by the arithmetic controller to turn the front and rear directions of the vehicle towards a direction of a car stop space, and further issues a loading command from the receiving-side control device to the vehicle-side control device to have the driving controller make the vehicle automatically drive along a track calculated by the arithmetic controller and load the vehicle, which is on the attitude control device, into the car stop space.

CITATION LIST

Patent Literature

PTL 1: Japanese Laid-Open Patent Application Publication No. 2011-089354

SUMMARY OF THE INVENTION

Problems to be Solved by the Invention

A large-scale facility such as a large-scale commercial facility or a large-scale amusement facility needs to manage parking of a large number of visiting vehicles; however, the conventional mechanical parking apparatus cannot be applied to such parking management in the first place. Thus, the actual circumstance is that: land or a building where the large number of vehicles can be parked is provided adjacent to the large-scale facility, and a visitor drives their vehicle by themselves to a parking space and parks the vehicle there, and then walks to an entrance of the large-scale facility.

Then, the visitor has to experience inconveniences of, for example, having to: drive the vehicle for long time to find a parking space of the vehicle when the large-scale facility is crowded; and walk to the entrance for a long distance when the parking space of the vehicle is located far from the entrance.

On the other hand, valet parking which is conducted at some hotels, restaurants, etc. is known as a parking management method capable of solving visitors' inconveniences. Regarding the valet parking, when a visitor gets out their vehicle at the entrance, an attendant of the facility moves the vehicle to a parking space. Thus, the valet parking has the advantage of solving various inconveniences experienced by the visitor when they have to park the vehicle themselves.

However, vehicle parking by the valet parking depends on manpower, so that it would be hardly acceptable to apply the valet parking to the parking management at the large-scale parking place built on the premises of the large-scale facility.

Thus, the present invention aims at proposing a parking management system and its control method capable of solving the inconveniences caused upon parking vehicles at the large-scale parking place built on the premises of the large-scale facility, and efficiently managing parking of a large number of vehicles.

Means to Solve the Problems

In order to solve the above-described problems, a parking management system for managing parking of vehicles according to the present invention includes: a guiding system for automatically guiding a vehicle from a passenger space to a certain parking space; a control system for controlling the guiding system; and a management system for accepting a parking reservation of the vehicle from a terminal system and conveying reservation information and identification information of the vehicle to the control system, wherein the control system causes, after the vehicle arrives at the passenger space and a passenger gets off the vehicle, the guiding system to guide the vehicle to, and park the vehicle at, the certain parking space on the basis of the reservation information and the identification information.

Advantageous Effects of the Invention

A parking management system and its control method capable of solving the inconveniences caused upon parking vehicles at the large-scale parking place built on the premises of the large-scale facility, and efficiently managing parking of a large number of vehicles can be realized according to the present invention.

BRIEF DESCRIPTION OF DRAWINGS

FIG. 5 is a reservation information table according to the embodiment of the present invention;

FIG. 6 is an environment information table according to the embodiment of the present invention;

FIG. 7 is a vehicle information table according to the embodiment of the present invention;

DESCRIPTION OF EMBODIMENTS

A parking management system according to the present invention is preferred as it can efficiently achieve parking management of a large number of vehicles, even when the valet parking is applied to a large-scale parking place built on the premises of a large-scale facility. Embodiments of the present invention will be explained below with reference to the drawings.

Figure 1:
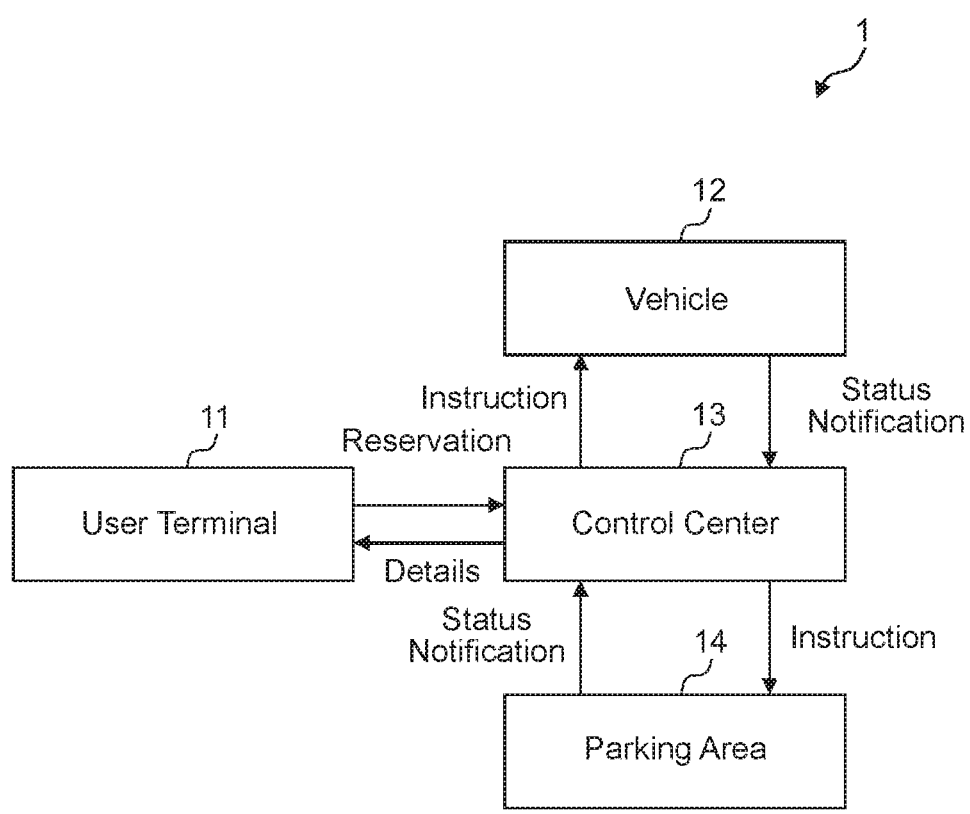
FIG. 1 is a schematic diagram of a parking management system according to an embodiment of the present invention.

(1) First Embodiment
(1-1) Configuration of Parking Management System According to this Embodiment Referring to FIG. 1 reference numeral 1 represents a parking management system according to this embodiment as a whole. This parking management system 1 is configured by including: a user terminal 11 held and used by a user of the parking management system 1; a vehicle 12 for the user to get in as a passenger; a control center 13 that accepts a reservation from the user terminal and issues instructions to the vehicle 12; and a parking place 14 that acquires environment information (information from a camera 14B, a pressure sensor 14A, a car stop sensor 14C, etc., which will be described later, in the parking place 14) and informs the control center 13 of the status.

The user terminal 11 which is a terminal system is a smartphone or a car navigation system, has a function exchanging information with the control center 13, and transmits reservation information to the control center 13. The control center 13 transmits detailed information to the user terminal 11 according to the reservation information.

Figure 2:
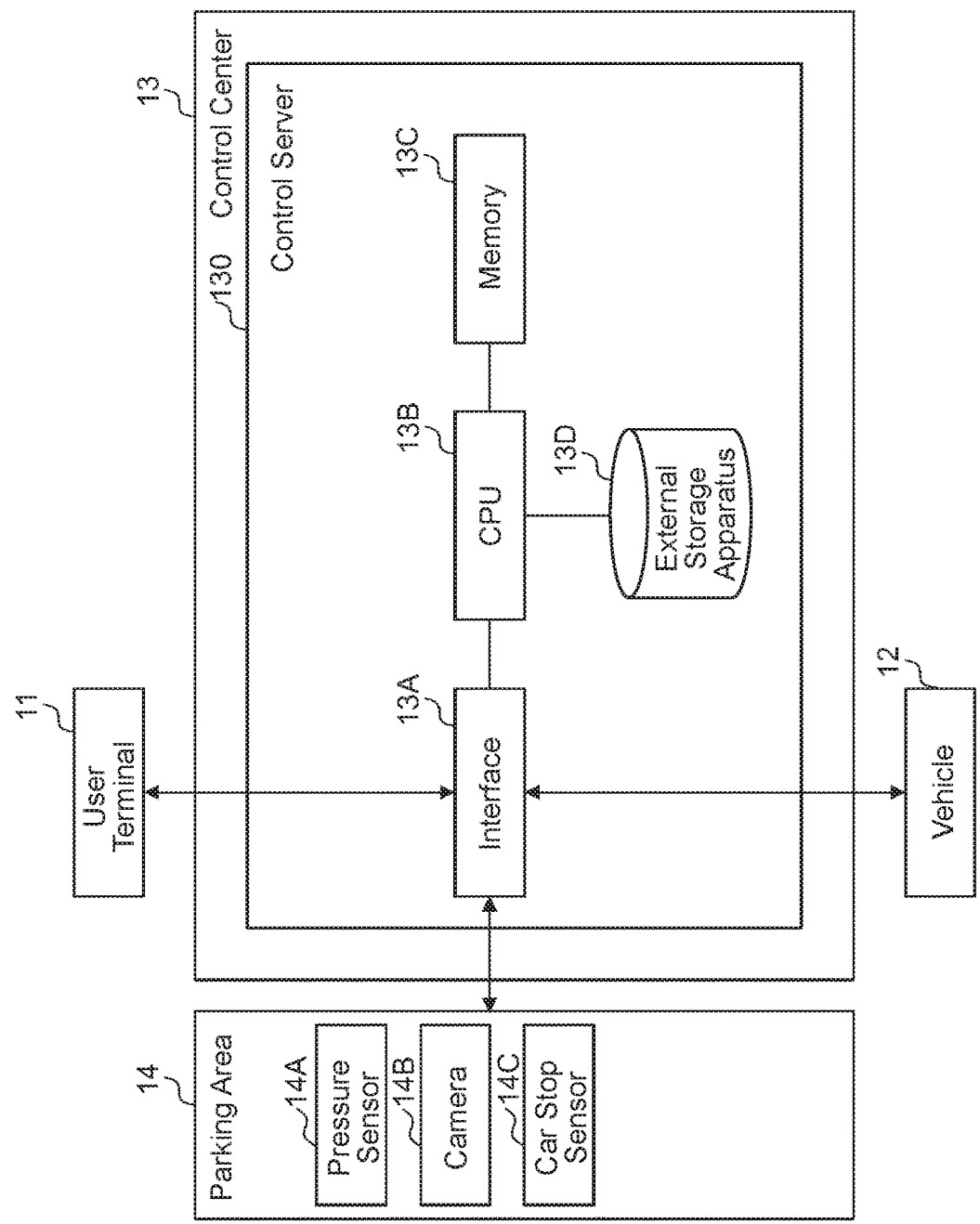
FIG. 2 is a hardware block diagram of the parking management system according to the embodiment of the present invention.

The parking place 14 is equipped with a pressure sensor 14A, a camera 14B, and a car stop sensor 14C as illustrated in FIG. 2. The parking place 14 acquires information indicating whether the vehicle 12 has passed the relevant place or not, from the pressure sensor 14A, acquires availability information of the parking place from the car stop sensor 14C, and acquires recognized object information (described later) (information about, for example, people and vehicles 30 described later which are not managed by the control center 13 and cannot be automatically guided) about a detected and recognized obstacle(s) from the camera 14B. The parking place 14 transmits the acquired information to the control center 13. The parking place 14 is equipped with an indicator light, a screen, a speaker, etc. which are not illustrated in the drawing and displays alert information and parking status on the indicator light, the screen, the speaker, etc. according to instructions from the control center 13.

The vehicle 12 is equipped with an automatic driving system which is a guiding system, and a control system described later causes a guiding system to prepare for automatic guiding of the vehicle 12 on the basis of the reservation information at the time of parking the vehicle 12, and the guiding system parks the vehicle 12 in a parking space 140 (described later) designated according to an instruction from the control center. In other words, the control system remotely operates the vehicle 12 from a passenger space 140A (described later) to the parking space 140 via the guiding system.

Similarly, at the time of unloading the vehicle 12, the control system causes the guiding system to prepare for automatic guiding of the vehicle 12 on the basis of the reservation information and the guiding system unloads the vehicle 12 from the designated parking space 140 according to an instruction from the control center 13.

The control center 13 is equipped with a control server 130 including an interface 13A, a CPU 13B, a memory 13C, and an external storage apparatus 13D as illustrated in FIG. 2. The control server 130 is a computer such as a server for an open system or a mainframe computer and the interface 13A exchanges information with the user terminal 11, the vehicle 12, and the parking place 14.

The external storage apparatus 13D is, for example, HDDs (Hard Disk Drives) or SSDs (Solid State Drives). The memory 13C is, for example, a ROM (Read Only Memory) or a RAM (Random Access Memory) and stores various types of data and programs, etc. which are necessary for processing of the CPU 13B which is a CPU (Central Processing Unit).

Figure 3:
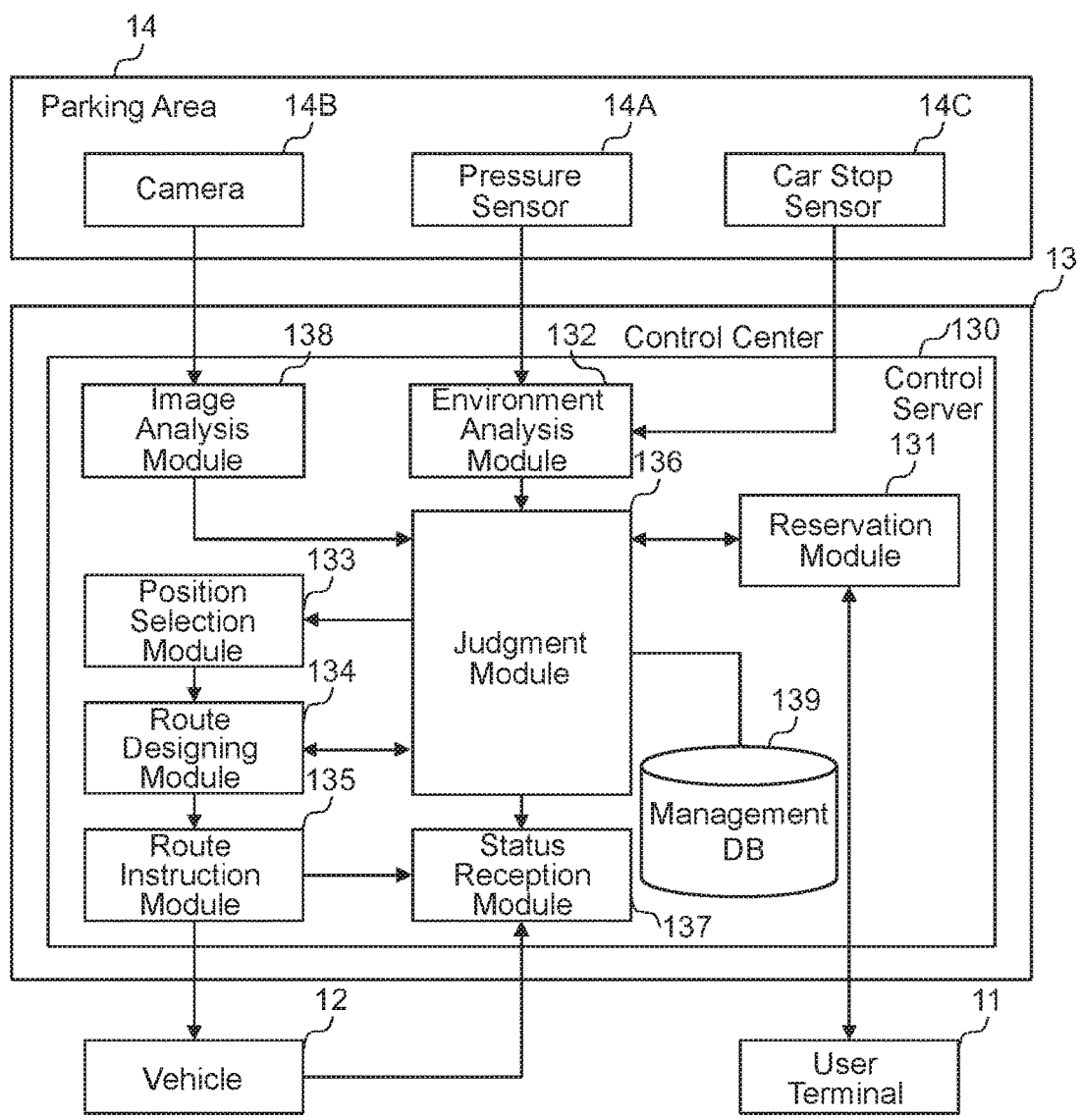
FIG. 3 is a functional block diagram of the parking management system according to the embodiment of the present invention.

The external storage apparatus 13D is equipped with a management database 139 (FIG. 3) including a reservation information table T1 and an environment information table T2 which will be described later. Furthermore, the memory 13C includes a reservation module 131, an environment analysis module 132, a position selection module 133, a route designing module 134, a route instruction module 135, a judgment module 136, a status reception module 137, and an image analysis module 138 as illustrated in FIG. 3. Note that the reservation module 131 is a management system; and the control system includes the environment analysis module 132, the position selection module 133, the route designing module 134, the route instruction module 135, the judgment module 136, the status reception module 137, and the image analysis module 138. The management database 139 is used by the control system, but may be used by the management system. Note that the image analysis module 138 may be part of the environment analysis module 132.

The reservation module 131 receives the reservation information including positional information, which indicates a user ID, reservation time, and a present position, and entry-exit information from the user terminal 11 and transmits the reservation information to the judgment module 136. The judgment module 136 judges a car stop position on the basis of the reservation information and transmits the car stop position to the reservation module 131. In response, the reservation module 131 transmits detailed information including the car stop position to the user terminal 11. Note that the judgment module 136 may judge, as the car stop position, a passenger space 140A which is not crowded or the passenger space 140A of a parking place 14 which has more empty spaces described later than those of other parking places 14.

The user ID is information for the parking management system 1 to identify the user and is determined unambiguously for each user. The reservation time is desired time to park or unload the vehicle, which is input by the user into the user terminal 11; and the positional information is information such as GPS (Global Positioning System) held by the user terminal 11. The entry-exit information is information which is input by the user into the user terminal and is information about a reservation of parking the vehicle (parking reservation) or a reservation of unloading the vehicle (unloading reservation).

In the case of the unloading reservation, when the reservation time is not input or unloading the vehicle is not completed by the reservation time, estimated unloading time, in addition to the car stop position, is included in the detailed information (unloading information); and when the unloading is completed, the detailed information (unloading completion notification) is transmitted again. Note that in the case of the unloading reservation, the user ID and the car number, in addition to the car stop position as an unloading position, may be included in the detailed information. Furthermore, in the case of the unloading reservation, the reservation information as unloading instruction information may not include the positional information. In the case of the parking reservation, when the reservation time is not input, time when the reservation is made is set as the reservation time. Note that in the case of the parking reservation, when the parking place 14 is crowded at that time, reservation time which is different from the reservation time entered by the user may be included in the detailed information so that the user will be requested to shift time to come to the parking place 14.

Note that the entry-exit information does not have to be input by the user and may be automatically judged by the reservation module 131 on the basis of the positional information, etc. For example, if the position indicated by the positional information is more than 10 km away from the parking place 14 and the reservation is for that day, it may be judged as the parking reservation. Furthermore, if a parking reservation of the same user is made immediately before the relevant reservation, the relevant reservation may be judged as the unloading reservation.

In order to find a destination in the case of the parking reservation, the judgment module 136 receives information indicating which parking space 140 is empty (empty space), from the car stop sensor 14C via the environment analysis module 132. The judgment module 136 transmits judgment information to the position selection module 133 on the basis of this received information; and the position selection module 133 selects the parking space 140 as the destination to park each vehicle 12 on the basis of this judgment information. In other words, the control system searches for the empty space. In the case of the unloading reservation, the passenger space 140A described later is the destination instead of the parking space 140.

The judgment module 136 receives information indicating which route is available, from the pressure sensor 14A via the environment analysis module 132. The route designing module 134 designs which route each vehicle 12 should take to the parking space 140 selected by the position selection module 133 also in consideration of this received judgment information.

The route instruction module 135 receives design information from the route designing module 134 and issues a route instruction as a movement instruction to the vehicle 12. Furthermore, in a case of a route change, the route instruction module 135 transmits route instruction information to the status reception module 137 (movement route modification instruction).

The status reception module 137 receives a vehicle status from the vehicle 12 on the basis of the positional information from the GPS, etc. mounted on the vehicle 12 and speed information from a car speed sensor, etc. mounted on the vehicle 12 and transmits the vehicle status to the judgment module 136 (to perform, for example, the user's vehicle position notification). The judgment module 136 judges whether it is necessary to conduct a route change or not, on the basis of this vehicle status; and then issues an instruction to the route designing module. Note that in an indoor case, the position may be estimated by SLAM (Simultaneous Localization and Mapping).

Note that when the vehicle 12 transmits the vehicle status to the status reception module 137 for the first time after communication between the vehicle 12 and the status reception module 137 is established, vehicle information of a vehicle information table T3 described later which is identification information of the vehicle may be transmitted to the status reception module 137. The route designing module 134 acquires the vehicle information of the vehicle information table T3 via the judgment module 136 and can thereby design a route by considering, for example, the difference in path traveled by front and rear wheels in turning. The vehicle information table T3 is included in the management database 139.

The image analysis module 138 acquires image information from the camera 14B and transmits the recognized object information based on the image information to the judgment module 136. The judgment module 136 transmits judgment information based on the recognized object information to the position selection module 133 and the route designing module 134; the position selection module 133 selects the parking space 140 on the basis of the judgment information; and the route designing module 134 designs the route on the basis of the judgment information.

(1-2) Outlines of Parking Management According to this Embodiment

Figure 4:
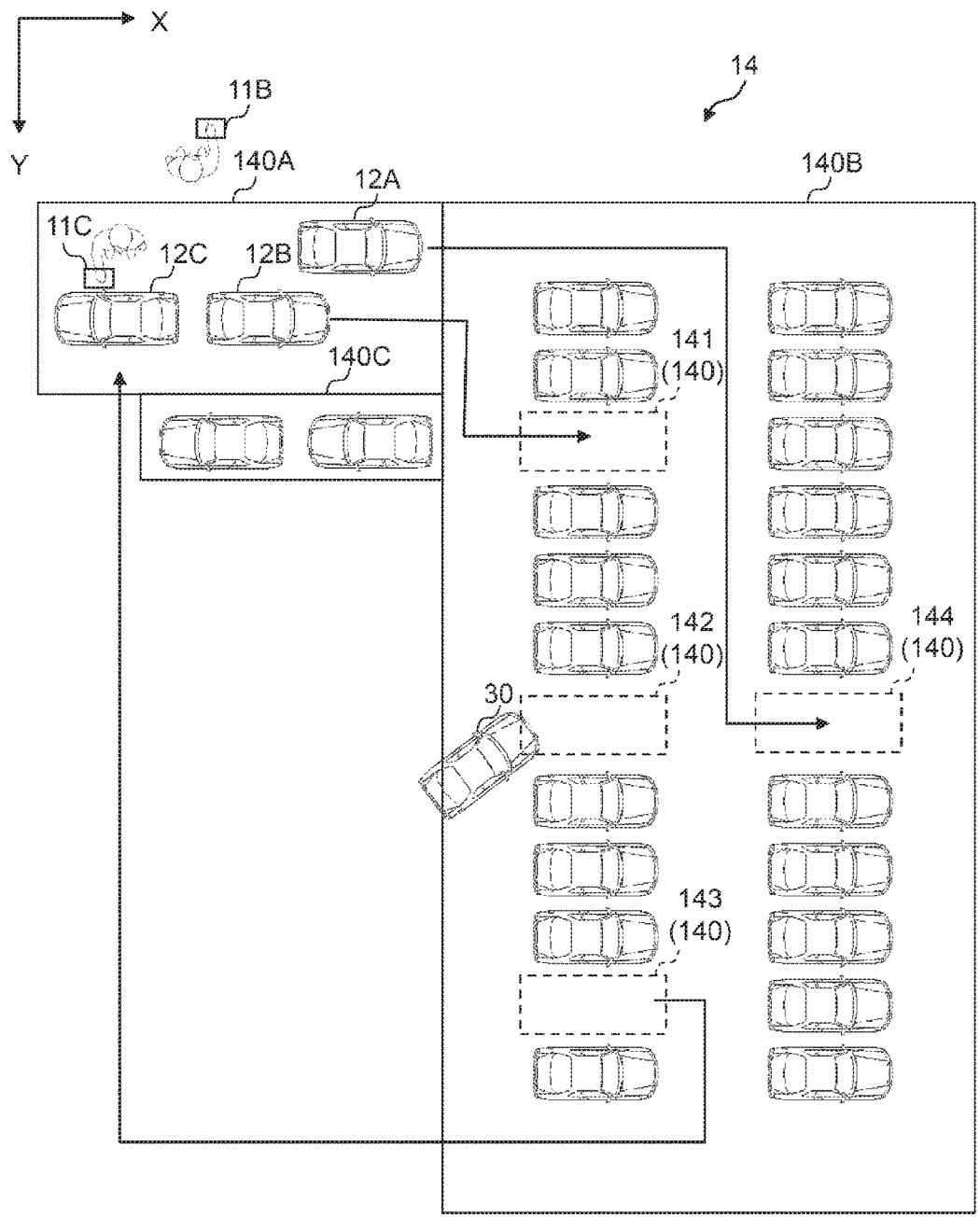
FIG. 4 is a vehicle route diagram of the parking management system according to the embodiment of the present invention.

FIG. 4 illustrates the parking place 14. The parking place 14 includes: the passenger space 140A for the user who is a passenger of a vehicle 12 to get in or out the vehicle; a parking area 140B to park a vehicle(s) 12; and a temporary parking space 140C to temporarily park the vehicle(s) 12. The parking area 140B includes parking spaces 141, 142, 143, and 144 for the respective vehicles 12 to park.

Note that when the vehicle 12 is automatically guided to the passenger space 140A by the guiding system at the time of unloading the vehicle and then the control system determines that predetermined specified time has passed without the user who is scheduled to use the vehicle 12 arriving at the passenger space 140A, the control system causes the guiding system to move the vehicle 12 to the temporary parking space 140C. Note that when the control system determines that the reservation time has passed, the control system may cause the guiding system to move the vehicle 12 to the temporary parking space 140C.

Referring to FIG. 4, the vehicle 12 represents vehicles 12A, 12B, and 12C, each one of which is automatically guided. The user terminal 11 represents user terminals 11B and 11C. Let us assume that the user terminal 11B made a parking reservation of the vehicle 12B and the user terminal 11C made an unloading reservation of the vehicle 12C. Furthermore, the parking space 140 represents parking spaces 141, 142, 143, and 144.

The parking space 144 is selected for the vehicle 12A by the position selection module 133 (FIG. 3); the parking space 141 is selected for the vehicle 12B by the position selection module 133; and the vehicles 12A and 12B start to move respectively according to their routes designated by the route instruction module 135 (FIG. 3). Furthermore, the vehicle 12C has moved according to its route designated by the route instruction module 135 and has arrived at the passenger space 140A selected by the position selection module 133.

Note that the passenger space 140A, the parking area 140B, and the temporary parking space 140C can fluxionally change their partitions. Furthermore, the parking area 140B may be set as an area here only the automatically guided vehicles 12 can pass, or an area where humans and the vehicles 30 which cannot be automatically guided can pass, or may be changed on a time basis. Furthermore, only part of the parking area 140B may be set as an area where only the automatically guided vehicles 12 can pass, or its area partitions may be changed on a time basis.

(1-3) Various Tables According to this Embodiment

FIG. 5 illustrates the reservation information table T1. The reservation information table T1 is composed of a user ID row T11, a reservation time row T12, an entry-exit row T13, a car stop position row T14, a positional information row T15, and a number row T16.

The judgment module 136 stores the user ID, the reservation time, the entry-exit time, and the positional information, which are the reservation information received from the user terminal 11, respectively in the user ID row T11 to the entry-exit row T13, and the positional information row T15 of the reservation information table T1 for the management database 139. The user ID and the car number of the vehicle 12 are associated with each other in a one-to-one relationship in the management database 139; and once the content of the user ID row T11 is decided, the content of the car number row T16 will be automatically decided.

The judgment module 136 judges the car stop position, which is the detailed information, on the basis of the reservation information and the judgment module 136 stores the car stop position in the car stop position row T14 of the reservation information table T1 for the management database 139.

FIG. 6 illustrates the environment information table T2. The environment information table T2 is composed of a recognition ID row T21, an intra-parking-place position (X-coordinate) row T22, an intra-parking-place position (Y-coordinate) row T23, a destination row T24, and a recognized object row T25.

A recognition ID, an intra-parking-place position (X-coordinate), an intra-parking-place position (Y-coordinate), a destination, and a recognized object, which are the recognized object information, are stored in the recognition ID row T21, the intra-parking-place position (X-coordinate) row T22, the intra-parking-place position (Y-coordinate) row T23, the destination row T24, and the recognized object row T25, respectively. The judgment module 136 stores the recognized object information in the environment information table T2. The image analysis module 138 analyzes the recognized information from the image information and transmits the analyzed recognized information to the judgment module 136.

The image analysis module 138 assigns the recognition ID to recognized objects which are recognized by analyzing the image information acquired form the camera 14B. For example, the numbers starting from one may be sequentially assigned as the recognition ID to the recognized objects in the recognized order.

The image analysis module 138 analyzes the image information acquired from the camera 14B and calculates the intra-parking-place position (X-coordinate) and the intra-parking-place position (Y-coordinate) which are values of the coordinate system (X-coordinate, Y-coordinate) illustrated in FIG. 4.

The image analysis module 138 analyzes the image information acquired from the camera 14B, extracts the outline of the recognized object and calculates the destination by tracking the outline across frames.

The image analysis module 138 analyzes the image information acquired from the camera 14B and recognizes the recognized object by means of, for example, pattern matching. In a case of a vehicle 30 which cannot be automatically guided, its car number is recognized by, for example, pattern matching.

The environment information table T2 illustrated in FIG. 6 is configured only on the basis of the image information which the image analysis module 138 has acquired from the camera 14B; however, the content of the environment information table T2 may be configured on the basis of information from the pressure sensor 14A and the car stop sensor 14C.

For example, the judgment module 136 may acquire the information of the pressure sensor 14A via the environment analysis module 132 and judge the destination based on that information. Furthermore, the judgment module 136 may acquire the information of the car stop sensor 14C via the environment analysis module 132 and may judge whether the vehicle is moving towards the parking space 140 or not.

FIG. 7 illustrates the vehicle information table T3. The vehicle information table T3 is composed of a vehicle ID row T31, a length row T32, a height row T33, a type row T34, a vehicle type row T35, a car number row T36, a color row T37, and an owner row T38.

Vehicle information includes a vehicle ID, length information, height information, type information, a vehicle type, a car number, color information, and owner information. The judgment module 136 stores the vehicle information in the respective rows of the vehicle information table T3.

The vehicle ID is information for identifying the relevant vehicle 12 and the numbers starting from one may be sequentially assigned to vehicles 12 in the identified order. The length information is information about the length of the vehicle 12 and may be used to, for example, calculate the difference in path traveled by front and rear wheels of the vehicle 12 in turning. The height information is information about the height of the vehicle 12; and when selecting the parking space 140, the position selection module 133 may refer to the height information and compare it with, for example, information about height limitations of the parking space 140. The type information is information about the type of the vehicle 12 and the difference in path traveled by front and rear wheels in turning may be set as a fixed value for each type.

The vehicle type is information about a vehicle type of the vehicle 12 and the difference in path traveled by front and rear wheels in turning may be fixed for each vehicle type. The car number is a car number of the vehicle 12; the color information is a color of the vehicle 12; and the owner information is information about an owner of the vehicle 12.

(1-4) Various Processing According to this Embodiment

Figure 8:
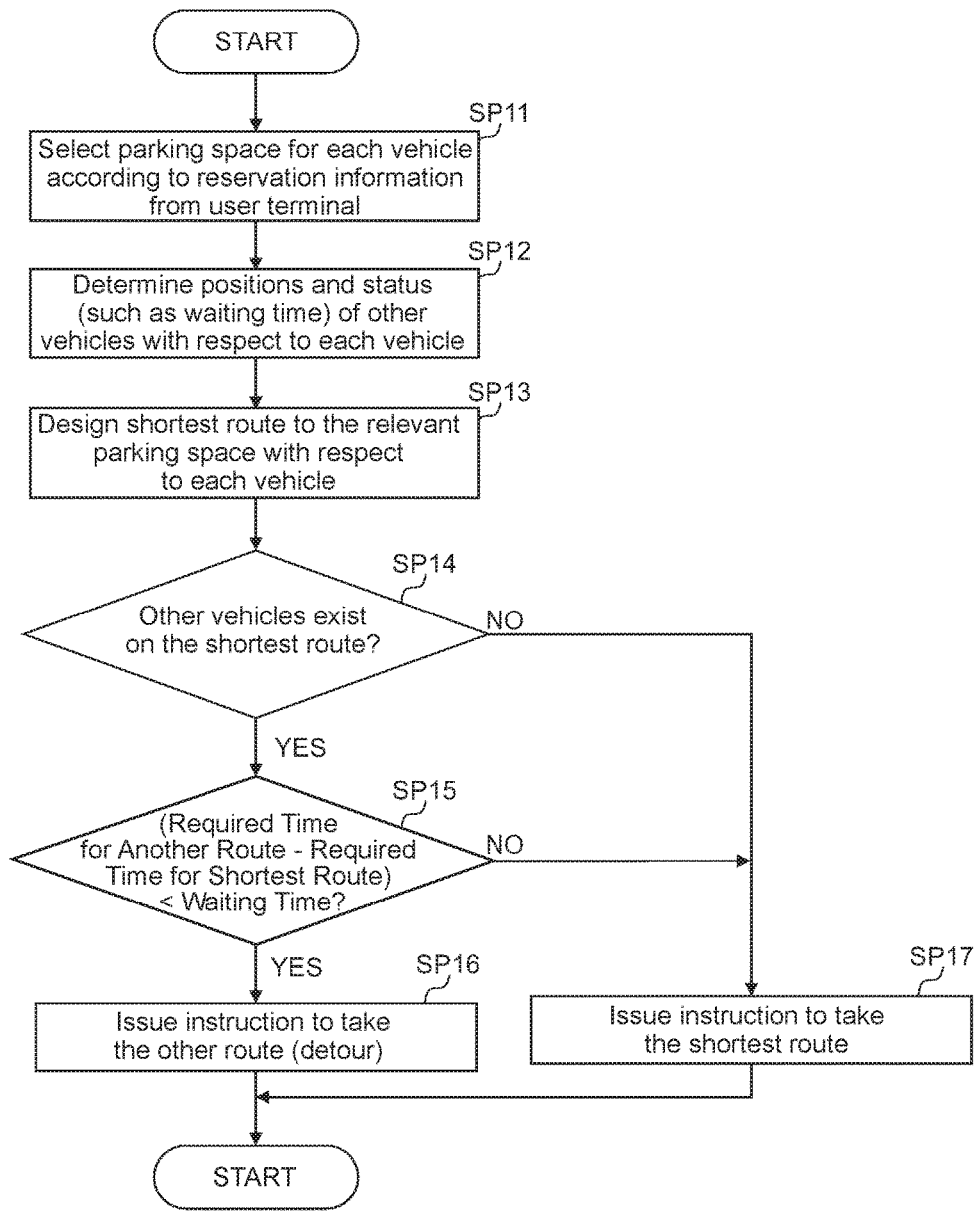
FIG. 8 is a processing flow of a control server according to the embodiment of the present invention.

FIG. 8 illustrates a processing flow of the control server 130. Firstly, the position selection module 133 selects a parking space 140 for each vehicle 12 according to the reservation information from the user terminal 11 (SP11) and transmits the selected content to the route designing module 134. Next, the judgment module 136 judges positions and status (such as waiting time) of other vehicles 12 with respect to each vehicle 12 (SP12) and transmits the judged content to the route designing module 134. Subsequently, the route designing module 134 designs the shortest route to the relevant parking space 140 with respect to each vehicle 12 (SP13).

The judgment module 136 judges whether or not other vehicles exist on the shortest route designed by the route designing module 134 (SP14). When an affirmative judgment result is obtained in SP14 (SP14: YES), the judgment module 136 subtracts required time to pass the shortest route from required time to pass another route which is the second shortest route (which is designed by the route designing module 134) after the shortest route. The judgment module 136 judges whether the result of this subtraction is shorter than waiting time when the shortest route is selected (SP15). Note that the judgment module 136 judges the required time and the waiting time by referring to the vehicle status of each vehicle 12.

When an affirmative judgment result is obtained in SP15 (SP15: YES), the route instruction module 135 issues an instruction to the vehicle 12 to take another route (detour) (SP16). When a negative judgment result is obtained in SP14 (SP14: NO) and when a negative judgment result is obtained in SP15 (SP15: NO), the route instruction module 135 issues an instruction to the vehicle to take the shortest route (SP17).

Figure 9:
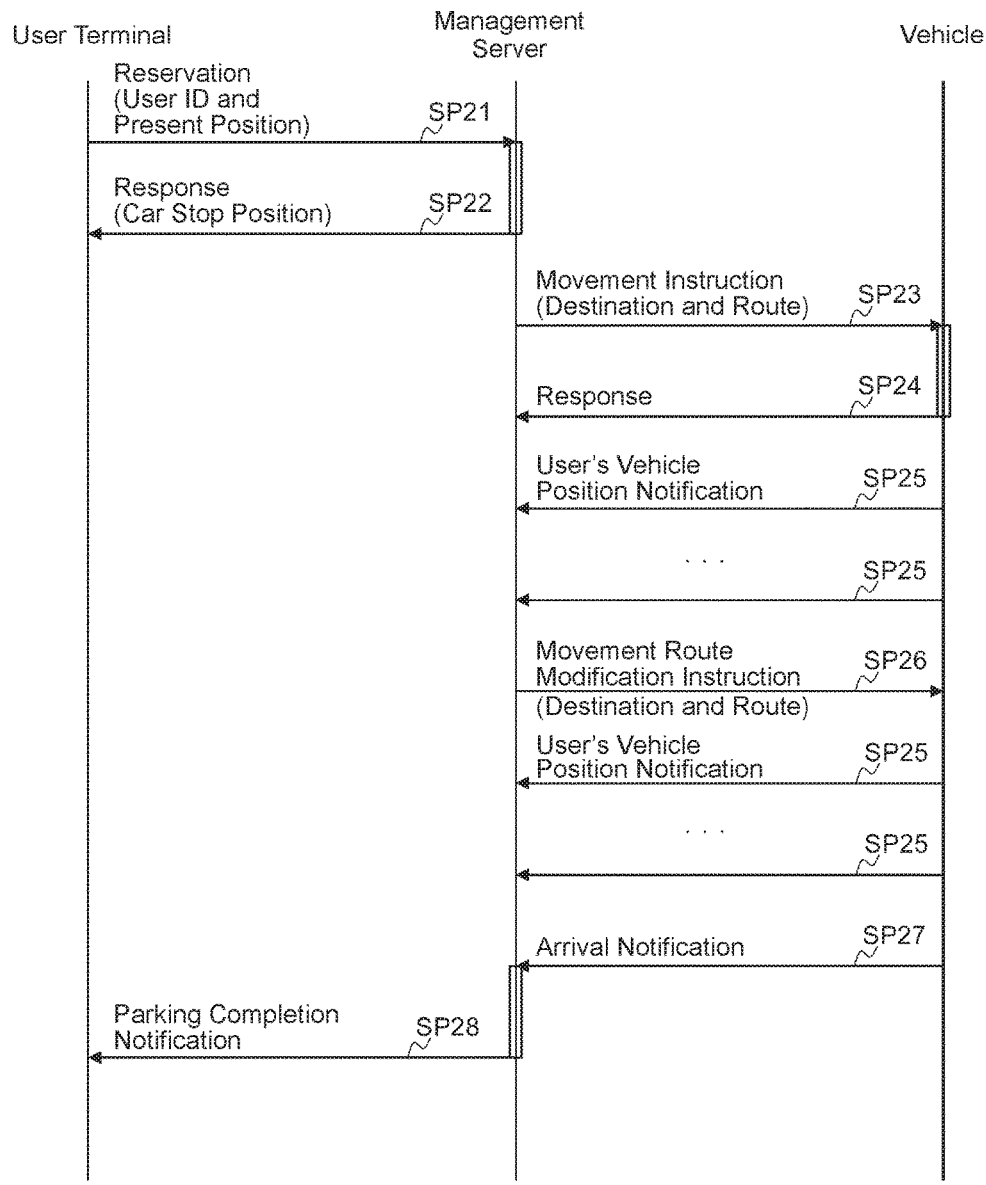
FIG. 9 is a sequence diagram at the time of parking vehicles according to the embodiment of the present invention.

FIG. 9 is a sequence diagram at the time of parking the vehicle 12. The user terminal 11 transmits the reservation information, including the user ID and the present position, to the control server 130 (SP21). In response to this reservation information, the control server 130 transmits a response including the car stop position to the user terminal 11 (SP22).

After transmitting this response, the control server 130 transmits a movement instruction including the destination and the route information to the vehicle 12 (SP23). In response to this movement instruction, the vehicle 12 transmits a response to the control server 130 (SP24). After transmitting this response, the vehicle 12 regularly transmits the user's vehicle position notification to the control server 130 (SP25). The control server 130 may transmit a movement route modification instruction, including the destination and the route information, to the vehicle 12 (SP26).

When the vehicle 12 arrives at the destination, it transmits an arrival notification to the control server 130 (SP27). After receiving this arrival notification, the control server 130 may transmit a parking completion notification to the user terminal 11 (SP28).

Figure 10:
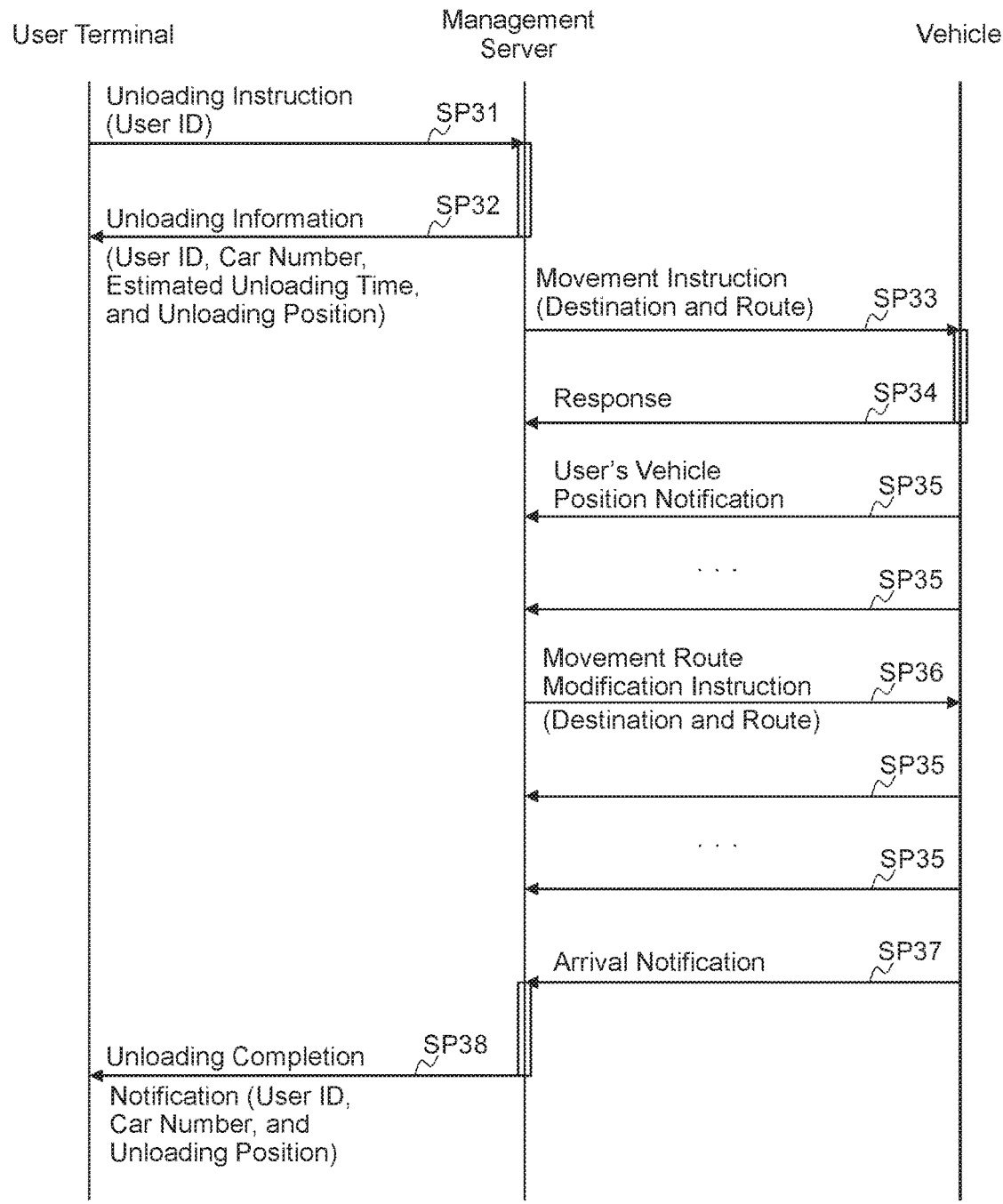
FIG. 10 is a sequence diagram at the time of unloading vehicles according to the embodiment of the present invention.

FIG. 10 illustrates a sequence diagram at the time of unloading the vehicle 12. Since steps SP33 to SP37 in which the control server 130 and the vehicle 12 exchange information with each other are similar to steps SP23 to SP27, an explanation about them has been omitted.

The user terminal 11 transmits unloading instruction information, including the user ID, to the control server 130 (SP31). In response to this unloading instruction information, the control server 130 transmits unloading information, including the car number, estimated unloading time, and an unloading position, to the user terminal 11 (SP32). After transmitting this unloading information, the control server 130 transmits a movement instruction, including the destination and the route information, to the vehicle 12 (SP33).

When the vehicle 12 arrives at the destination, it transmits the arrival notification to the control server 130 (SP37). After receiving this arrival notification, the control server 130 transmits an unloading completion notification, including the user ID, the car number, and the unloading position, to the user terminal 11 (SP38).

(1-5) Advantageous Effects of this Embodiment

With the parking management system 1 according to this embodiment for having the control center 13 manage the parking place as described above, individual vehicles 12 are not manage separately, but the vehicles 12 can share information through the intermediation of the control center 13.

Therefore, a plurality of vehicles 12 can be controlled and the large-scale parking place 14 can be managed efficiently by employing this parking management system 1.

Furthermore, as a result of informing the user of the estimated unloading time, the user can recognize how much longer they can stay at a store and, therefore, wasteful waiting time can be saved and the opportunities for the user to purchase products until the estimated unloading time can be increased.

(2) Second Embodiment

The first embodiment is designed on the premise that the vehicle 12 is equipped with the guiding system and can be controlled by the control center 13 and be automatically guided; and if the vehicle 12 is not equipped with the guiding system, the first embodiment cannot be applied.

Figure 11:
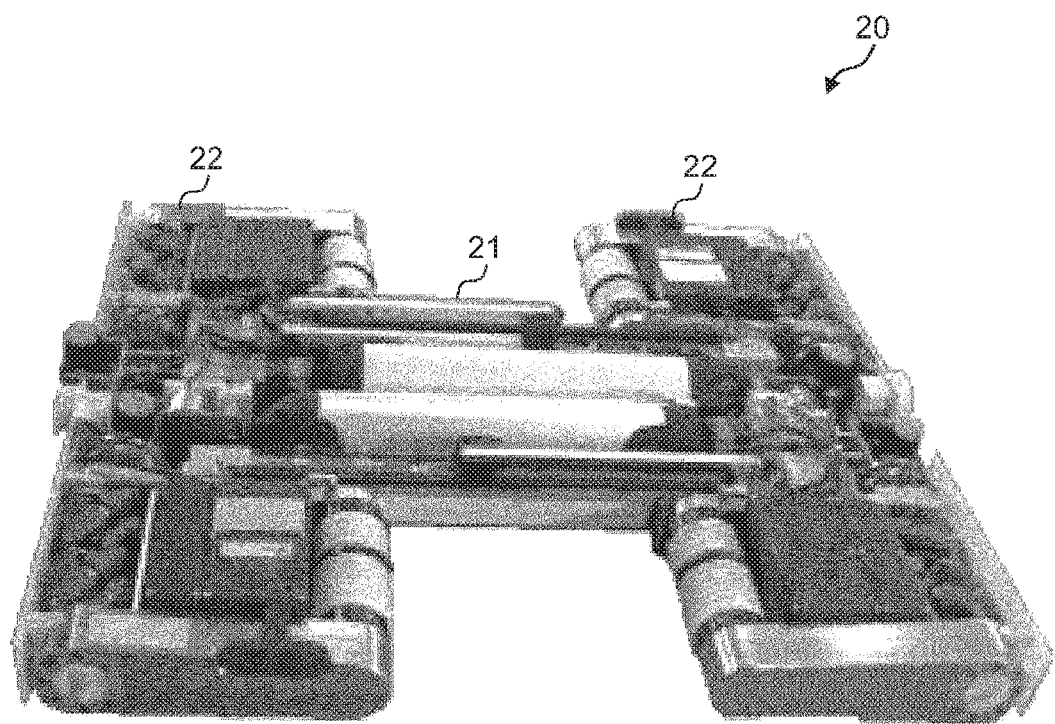
FIG. 11 illustrates a guiding robot according to an embodiment of the present invention.
Figure 12:
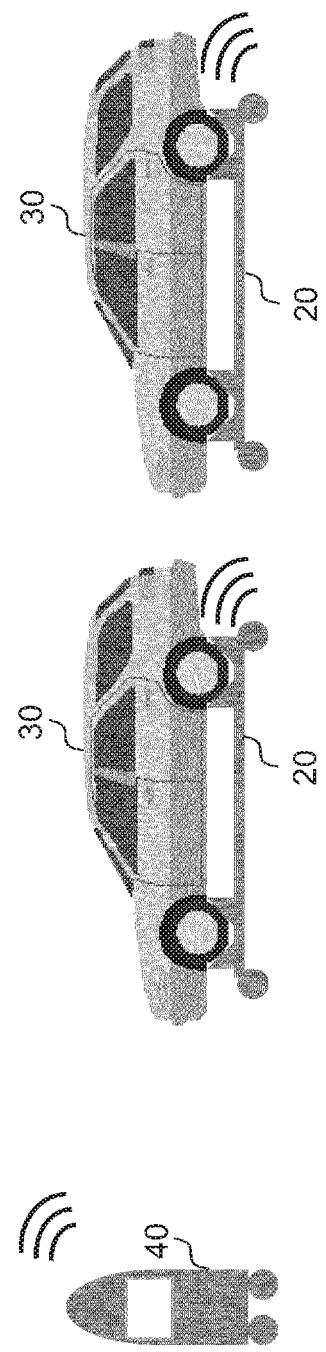
FIG. 12 illustrates a control robot and a control robot according to the embodiment of the present invention.

Thus, in this embodiment, a vehicle 30 which cannot be automatically guided can be recognized as the vehicle 12 in a simulative manner by placing a guiding robot 20, which is a carrier robot illustrated in FIG. 11, under the vehicle 30 which cannot be automatically guided, as illustrated in FIG. 12. Note that the guiding robot 200 may be caused by the control system to wait in the passenger space 140A (FIG. 4). Furthermore, the guiding robot 20 can be self-driven in a state where the vehicle 30 is mounted on it.

The guiding robot 20 includes: a lengthwise-direction extension/contraction module 21 which can extend and contract according to the length of the vehicle 30 which cannot be automatically guided; and widthwise-direction extension/contraction modules 22 which can extend and contract according to the width of the vehicle 30 which cannot be automatically guided. The guiding robot 20 is equipped with a guiding system, so that the vehicle 30 can be recognized as being equivalent to the vehicle 12 by attaching the guiding robot 20 to the vehicle 30 which cannot be automatically guided.

Therefore, according to this embodiment, it is possible to automatically guide the vehicle 30, which cannot be automatically guided, in the same manner as in the first embodiment.

Furthermore, a control robot 40 equipped with a control system as illustrated in FIG. 12 may control the guiding robot 20. The control server may be equipped with a control system and the control robot 40 may serve an assisting role.

(3) Other Embodiments

Figure 13:
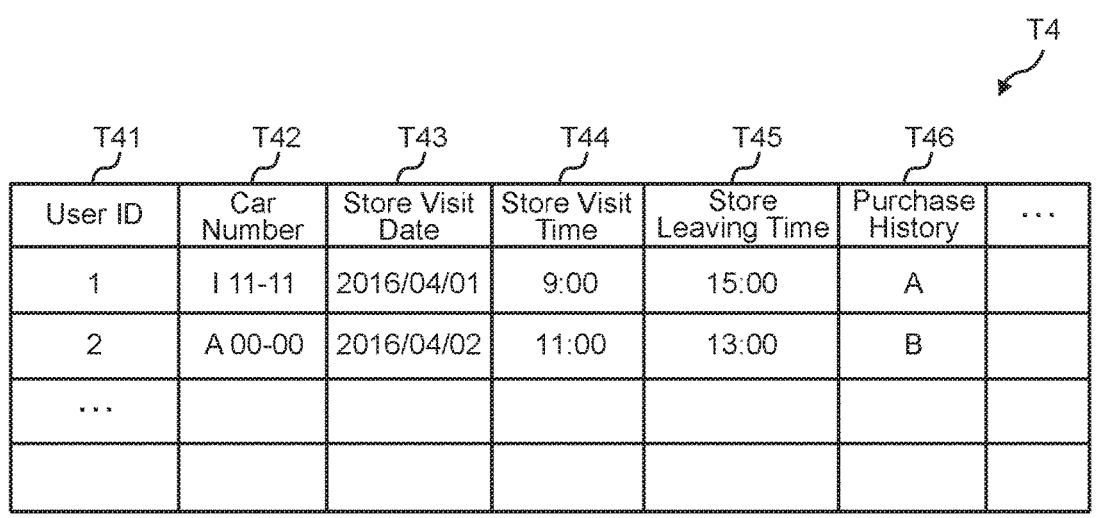
FIG. 13 is a user history table according to the embodiment of the present invention.

Note that in the first and second embodiments, the management database 139 may include a user history table T4 illustrated in FIG. 13; and whether the user will park their vehicle on that day or not, or whether the user will unload their vehicle if they have already parked it, may be predicted according to the user's behavior pattern in the past and a confirmation may be made by, for example, sending e-mail to the user.

The user history table T4 includes: a user ID row T41 that stores the aforementioned user ID; a car number row T42 that stores the aforementioned car number; a store visit date row T43 that stores the user's store visit date; a store visit time row T44 that stores time when the user visited the store; a store leaving time row T45 that stores time when the user left the store; and a purchase history row T46 that stores products purchased by the user at the store (purchased products).

Note that regarding the store herein used, when there is a common parking place for a plurality of stores like a shopping mall, the individual stores may be displayed separately or the shopping mall may be displayed as one store. The judgment module 136 stores the content of each row of the user history table T4 for the management database 139.

The information of the store visit date, the store visit time, the store leaving time, and the purchased products are acquired by the user terminal 11; the user terminal 11 transmits such information to the judgment module 136 via the reservation module 131; and the information is saved as, for example, a movement history of the vehicle in the management database 139.

Furthermore, in the first and second embodiments, the parking space 140 has a uniform size, but may be a variable space; and the position selection module 133 may select the parking space 140 of the vehicle 12 according to the vehicle information from the vehicle 12. The number of parking spaces 140 in the parking place 14 where vehicles 12 are parked can be increased by making the parking space 140 variable. In other words, utilization efficiency of the parking dimensions, that is, the planar dimensions of the parking place 14 can be enhanced. Note that the utilization efficiency of the parking dimensions can be enhanced by narrowing or decreasing routes according to the vehicle information from the vehicle 12.

In the first and second embodiments, when there is any other vehicle(s) on the shortest route, only the second shortest route is considered as a comparison target as the other route; however, the number of routes to be compared is not limited to two.

In the first and second embodiments, the car stop sensor 14C is used to find the destination; however, the camera 14B may also be used for that purpose. Furthermore, the pressure sensor 14A is used to judge whether there is any available route or not; however, the camera 14B may also be used for that purpose.

Additionally in the first and second embodiments, the vehicle(s) 12, and the vehicle(s) 30, which is not guided and on which the guiding robot 20 is provided, are not presented together here, however may be presented together. Not only the guiding robot 20, but also a forklift, etc. may be used to guide the vehicle 30 not guided.

REFERENCE SIGNS LIST

1: parking management system
11: user terminal
12, 30: vehicle
13: control center
130: control server
131: reservation module
133 position selection module
134: route designing module
135: route instruction module
136: judgment module
137: status reception module
138: image analysis module
139: management database
14: parking place
20: guiding robot
40: control robot

The invention claimed is:

1. A parking management system for managing parking of a vehicle, comprising:
   a guiding system for automatically guiding the vehicle from a passenger space to a parking space;
   a control system for controlling the guiding system; and
   a management system for accepting a parking reservation of the vehicle from a terminal system and conveying reservation information and identification information of the vehicle to the control system,
   wherein the control system causes, after the vehicle arrives at the passenger space and a passenger gets off the vehicle, the guiding system to guide the vehicle to, and park the vehicle at, the parking space determined on the basis of the reservation information and the identification information.

2. The parking management system according to claim 1, wherein the guiding system is an automatic driving system which is built in the vehicle; and
   wherein the control system remotely operates the vehicle from the passenger space to the parking space via the automatic driving system.

3. The parking management system according to claim 1, wherein the guiding system is a carrier robot capable of self-driving in a state where the vehicle is mounted; and
   wherein the control system remotely operates the carrier robot from the passenger space to the parking space.

4. The parking management system according to claim 3, wherein the control system causes the guiding system to wait in the passenger space for the vehicle to arrive on the basis of the reservation information.

5. The parking management system according to claim 1, wherein when the control system issues an instruction to the guiding system to take a route to the parking space, the control system judges whether or not another vehicle exists on the route which is a shortest route; and when the other vehicle exists on the route which is the shortest route, the control system: judges whether to wait or detour by comparing required time of the shortest route with that of another route; and then issues an instruction to the guiding system to take the route of shorter required time.

6. The parking management system according to claim 1, wherein the control system searches for an empty space in a parking area, determines a position to park the vehicle on the basis of the identification information of the vehicle, and issues an instruction to the guiding system to designate the determined position.

7. The parking management system according to claim 1, wherein the control system controls the guiding system on the basis of information from a sensor for detecting an obstacle.

8. The parking management system according to claim 1, wherein the management system informs the terminal system of whether the parking reservation is required or not, on the basis of a movement history of the vehicle.

9. The parking management system according to claim 1, wherein the management system accepts an unloading reservation of the vehicle, which is parked in the parking space, from the terminal system and then conveys the reservation information about the unloading reservation to the control system; and
   wherein the control system causes the guiding system to guide the vehicle from the parking space to the passenger space on the basis of the reservation information about the unloading reservation.

10. The parking management system according to claim 9,
wherein when the control system judges that reservation time for the unloading reservation has passed, the control system causes the guiding system to move the vehicle in the passenger space to a temporary parking space.

11. A parking management method for managing parking of a vehicle, comprising:
automatically guiding the vehicle from a passenger space to a parking space by way of a guiding system;
controlling the guiding system by a control system;
accepting a parking reservation of the vehicle from a terminal system and conveying reservation information and identification information of the vehicle to the control system; and
causing by the control system, after the vehicle arrives at the passenger space and a passenger gets off the vehicle, the guiding system to guide the vehicle to, and park the vehicle at, the parking space determined on the basis of the reservation information and the identification information.

\* \* \* \* \*